US009255611B2

(12) United States Patent
Fujio

(10) Patent No.: US 9,255,611 B2
(45) Date of Patent: Feb. 9, 2016

(54) CONSTANT VELOCITY UNIVERSAL JOINT

(75) Inventor: Teruaki Fujio, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/114,949

(22) PCT Filed: Apr. 27, 2012

(86) PCT No.: PCT/JP2012/061411
§ 371 (c)(1),
(2), (4) Date: Oct. 31, 2013

(87) PCT Pub. No.: WO2012/160951
PCT Pub. Date: Nov. 29, 2012

(65) Prior Publication Data
US 2014/0080612 A1  Mar. 20, 2014

(30) Foreign Application Priority Data

May 25, 2011  (JP) .................................. 2011-117048

(51) Int. Cl.
*F16D 3/224*  (2011.01)
*F16D 3/24*  (2006.01)
*F16D 3/2245*  (2011.01)
*F16D 3/223*  (2011.01)

(52) U.S. Cl.
CPC ................ *F16D 3/24* (2013.01); *F16D 3/2245* (2013.01); *F16D 2003/22309* (2013.01)

(58) Field of Classification Search
CPC    F16D 3/2244; F16D 3/24; F16D 2003/22309
USPC .................................................. 464/144, 906
See application file for complete search history.

(56) References Cited

U.S. PATENT DOCUMENTS 2,319,100 A * 5/1943 Anderson ...................... 464/144
5,531,643 A * 7/1996 Welschof ....................... 464/144

(Continued)

FOREIGN PATENT DOCUMENTS

| CN | 101606001 | 12/2009 |
|---|---|---|
| JP | 2009-250365 | 10/2009 |

(Continued)

OTHER PUBLICATIONS

English translation of International Preliminary Report on Patentability and Written Opinion of the International Searching Authority mailed Dec. 5, 2013 in International Application No. PCT/JP2012/061411.

(Continued)

*Primary Examiner* — Greg Binda
(74) *Attorney, Agent, or Firm* — Wenderoth, Lind & Ponack LLP

(57) ABSTRACT

A constant velocity universal joint smoothly operates under load and during speed rotation, and also suppresses heat generation and has enhanced durability. An offset in an axial direction between a center of curvature of each of track grooves and a center of curvature of an inner surface of an outer joint member, and an offset in the axial direction between a center of curvature of each of track grooves and a center of curvature of an outer surface of an inner joint member are each set to zero. The track grooves of the outer and inner joint members are each inclined with respect to an axial line. A circumferential length of each of pockets of a cage is set so that two pockets allow balls to be assembled therein at one time under a state in which the two pockets are exposed.

3 Claims, 23 Drawing Sheets

(56) References Cited

U.S. PATENT DOCUMENTS

| | | | |
|---|---|---|---|
| 8,568,245 B2 * | 10/2013 | Fujio et al. | 464/144 |
| 2010/0016086 A1 | 1/2010 | Sone et al. | |
| 2012/0165105 A1 | 6/2012 | Fujio et al. | |

FOREIGN PATENT DOCUMENTS

| | | | |
|---|---|---|---|
| JP | 2010-043667 | | 2/2010 |
| JP | 2010-242931 | * | 10/2010 |
| JP | 2010-242931 A | * | 10/2010 |
| JP | 2011-80555 | | 4/2011 |
| WO | WO 2011/043268 A1 | * | 4/2011 |

OTHER PUBLICATIONS

International Search Report issued Jul. 10, 2012 in International (PCT) Application No. PCT/JP2012/061411.

Office Action issued Jun. 26, 2015 in corresponding Chinese patent application No. 201280025286.8 (with English translation).

* cited by examiner

CONSTANT VELOCITY UNIVERSAL JOINT

BACKGROUND OF THE INVENTION

1. Technical Field

The present invention relates to a constant velocity universal joint, and more particularly, to a fixed type constant velocity universal joint which is used in, for example, a power transmission system for automobiles and various industrial machines.

2. Description of the Related Art

For example, a fixed type constant velocity universal joint is taken as one type of a constant velocity universal joint used as means for transmitting a rotational force from an engine to wheels of an automobile at a constant velocity. The fixed type constant velocity universal joint has a structure in which two shafts on a driving side and a driven side are coupled to each other so as to be capable of transmitting rotational torque at a constant velocity even when the two shafts form an operating angle. In general, a Birfield type (BJ) constant velocity universal joint and an undercut-free type (UJ) constant velocity universal joint have been widely known as the above-mentioned constant velocity universal joint.

Further, in recent years, there have been provided a constant velocity universal joint in which, in order to perform smooth operation even under high load and in high speed rotation, and to suppress heat generation and enhance durability, the number of balls as torque transmitting members is set to eight, an offset in an axial direction between centers of curvature of track grooves is set to zero, and adjacent track grooves are inclined (JP 2009-250365 and JP 2010-43667). Specifically, as illustrated in FIG. 33, this constant velocity universal joint includes, as a main part, an outer joint member 3 having an inner surface 1 provided with a plurality of track grooves 2, an inner joint member 6 having an outer surface 4 provided with a plurality of track grooves 5, a plurality of balls 7 arranged in ball tracks formed of the track grooves 2 of the outer joint member 3 and the track grooves 5 of the inner joint member 6 in cooperation with each other, and a cage 9 including pockets 8 for receiving the balls 7.

Further, an offset in an axial direction between a center of curvature of each of the track grooves 2 of the outer joint member 3 and a center of curvature of the inner surface of the outer joint member 3, and an offset in the axial direction between a center of curvature of each of the track grooves 5 of the inner joint member 6 and a center of curvature of the outer surface of the inner joint member 6 are each set to zero.

As illustrated in FIG. 34, the track grooves 2 of the outer joint member 3 include track grooves 2a and 2b inclined in directions opposite to each other with respect to an axial line. An axial line La of each of the first track grooves 2a is inclined at a predetermined angle γ in a counterclockwise direction with respect to a straight line L1 parallel to a joint axial line. An axial line Lb of each of the second track grooves 2b is inclined at the predetermined angle γ in a clockwise direction with respect to a straight line L2 parallel to the joint axial line.

As illustrated in FIG. 35, the track grooves 5 of the inner joint member 6 include track grooves 5a and 5b inclined in directions opposite to each other with respect to the axial line. Specifically, an axial line La1 of each of the first track grooves 5a is inclined at the predetermined angle γ in the clockwise direction with respect to a straight line L11 parallel to the joint axial line. An axial line Lb1 of each of the second track grooves 5b is inclined at the predetermined angle γ in the counterclockwise direction with respect to a straight line L12 parallel to the joint axial line.

With this, the track grooves 2 of the outer joint member 3 and the track grooves 5 of the inner joint member 6, which respectively face the track grooves 2 of the outer joint member 3, are inclined in directions opposite to each other with respect to the axial line.

In the constant velocity universal joint structured as described above, circumferentially adjacent track grooves intersect with each other. Thus, forces of pressing cage windows in directions opposite to each other are generated in the adjacent track grooves. Thus, significant stress is applied to cage posts (parts between the windows), and hence the cage posts need to have high rigidity.

SUMMARY OF THE INVENTION

1. Technical Problems

By the way, in the constant velocity universal joint illustrated in FIG. 33, in order to assemble the balls 7, as illustrated in FIGS. 38 to 40, the inner joint member 6 and the cage 9 are inclined with respect to the outer joint member 3 so as to expose one of the pockets 8 from the outer joint member 3. Then, one of the balls 7 is assembled into the one of the pockets 8, which is exposed to an outside. After that, by sequentially repeating the same step, the balls 7 can be assembled into all the pockets 8.

By the way, when an operating angle is formed in such a constant velocity universal joint, the balls 7 in the pockets are moved in a circumferential direction (direction along a circle) at intersection angles and phase angles of the balls. FIG. 41 shows circumferential moving amounts of the balls 7 in the pockets 8 of the cage 9.

Thus, based on such a graph of FIG. 41, moving amounts of the balls 7 in the pockets are calculated, and a circumferential length W1 (refer to FIGS. 36 and 37) of each of the pockets 8 is set so as to prevent the pockets 8 from interfering with the balls 7 at the time of ball assembly. The circumferential moving amounts of the balls 7 vary in accordance with the intersection angles, the operating angle, and the like. In this case, the circumferential moving amounts increase in proportion to an increase in operating angle. Therefore, when the circumferential moving amounts are large, the pocket circumferential length W1 (refer to FIGS. 36 and 37) increases in accordance therewith. As a result, a circumferential thickness t1 of each of post portions 11 between the pockets (in this case, thickness on a radially inner side) decreases, and hence strength of the cage 9 is deteriorated. Note that, FIG. 36 illustrates moving amounts B1 of the balls 7 in the pockets 8.

In view of such circumstances, the present invention provides a constant velocity universal joint capable of performing smooth operation even under load and in high speed rotation, and also capable of suppressing heat generation and enhancing durability, specifically, a fixed type constant velocity universal joint capable of increasing easiness of ball assembly and enhancing cage strength.

2. Solution to Problems

According to one embodiment of the present invention, there is provided a constant velocity universal joint of a fixed type, comprising: an outer joint member having an inner surface provided with eight track grooves; an inner joint member having an outer surface provided with eight track grooves that are paired with the eight track grooves of the outer joint member; eight balls that are interposed between the eight track grooves of the outer joint member and the eight track grooves of the inner joint member, for transmitting torque; and a cage that is interposed between the inner surface of the outer joint member and the outer surface of the inner joint member and comprises pockets for holding the eight balls, in which an offset in an axial direction between a center of curvature of each of the eight track grooves of the outer joint member and a center of curvature of the inner surface of the outer joint member, and an offset in the axial direction between a center of curvature of each of the eight track grooves of the inner joint member and a center of curvature of the outer surface of the inner joint member are each set to zero, in which the eight track grooves of the outer joint member and the eight track grooves of the inner joint member are each inclined with respect to an axial line, in which circumferentially adjacent track grooves among the eight track grooves of the outer joint member and circumferentially adjacent track grooves among the eight track grooves of the inner joint member are inclined in directions opposite to each other, in which the eight track grooves of the outer joint member and the eight track grooves of the inner joint member, which respectively face the eight track grooves of the outer joint member, are inclined in directions opposite to each other with respect to the axial line, and in which a circumferential length of each of the pockets of the cage is set so that two of the pockets allow a corresponding number of balls to be assembled therein at one time under a state in which the two of the pockets are exposed from the outer joint member through inclination of the cage at a predetermined angle with respect to the outer joint member.

In the fixed type constant velocity universal joint of the present invention, the track offsets are each set to zero, the adjacent track grooves of the outer joint member and the adjacent track grooves of the inner joint member are alternately intersected with each other, and forces are applied alternately to the pockets adjacent to each other. In this way, wedge angles are formed alternately in the opposite directions. Thus, a position of the cage is stabilized within planes obtained by bisection of the inner joint member and the outer joint member. In addition, in an assembly step, the balls can be assembled at one time into the two of the pockets. Thus, when the balls are assembled two at a time, all the eight balls are assembled by performing the assembly of two balls four times in total. Further, in pockets out of phase in a circumferential direction with the two of the assembling pockets, circumferential moving amounts of the balls can be reduced. Thus, the circumferential length of each of the pockets can be set to be smaller than a circumferential length thereof in the case where the balls are assembled one at a time.

The outer joint member may comprise, at an end surface thereof: first portions that are large in distance between axial opening ends of the eight track grooves; and second portions that are small in distance between the axial opening ends of the eight track grooves. The first portions and the second portions may be arranged alternately to each other in a circumferential direction. A part between the two of the pockets, which allow the corresponding number of balls to be assembled therein at one time, may face corresponding one of the first portions. Further, the part between the two of the pockets, which allow the corresponding number of balls to be assembled therein at one time, may face corresponding one of the second portions.

The inner surface of the outer joint member may comprise a cylindrical surface. Alternatively, the inner surface of the outer joint member may comprise a cylindrical surface, and the cylindrical surface may comprise a tapered portion, which is provided at an opening portion thereof and gradually reduced in diameter toward an opening end thereof. When the inner surface of the outer joint member is formed into the cylindrical surface, easiness of assembly of the cage into the outer joint member and processability of the outer joint member are enhanced. Further, the cage has a convex outer spherical surface, and hence the inner surface of the outer joint member and the outer spherical surface of the cage are not substantially held in contact with each other.

The inner surface of the outer joint member may be formed into a spherical shape, and a gap may be formed between this inner surface and the outer spherical surface of the cage. Alternatively, the inner surface of the outer joint member may be formed into an elliptical shape, and a gap may be formed between this inner surface and the outer spherical surface of the cage. When the gap is formed in this way, circulation of a lubricant is promoted.

The outer surface of the inner joint member may comprise a cylindrical surface. When the outer surface is formed into the cylindrical surface as described above, easiness of assembly of the inner joint member into the cage and processability of the inner joint member are enhanced. Further, the cage has a concave inner spherical surface, and hence the outer surface of the inner joint member and the inner spherical surface of the cage are not substantially held in contact with each other.

The outer surface of the inner joint member may be formed into a spherical shape, and a gap may be formed between this outer surface and the inner spherical surface of the cage. Alternatively, the outer surface of the inner joint member may be formed into an elliptical shape, and a gap may be formed between this outer surface and the inner spherical surface of the cage. When the gap is formed in this way, circulation of a lubricant is promoted.

The center of curvature of the each of the eight track grooves of the outer joint member and the center of curvature of the each of the eight track grooves of the inner joint member may be offset from each other in a radial direction with respect to a joint center. In this case, the center of curvature of the each of the eight track grooves of the outer joint member and the center of curvature of the each of the eight track grooves of the inner joint member may be displaced in a direction away from the joint center. Alternatively, the center of curvature of the each of the eight track grooves of the outer joint member and the center of curvature of the each of the eight track grooves of the inner joint member may be displaced in a direction closer with respect to the joint center.

The eight track grooves of the outer joint member and the eight track grooves of the inner joint member may be formed through forging or a machining process. Alternatively, a finishing process on the inner surface of the outer joint member may be omitted, or a finishing process on the outer surface of the inner joint member may be omitted.

3. Advantageous Effects of Invention

In the fixed type constant velocity universal joint according to the present invention, forces are applied alternately to the pocket portions adjacent to each other, and hence wedge angles are formed alternately in the opposite directions. Thus, the position of the cage is stabilized within planes obtained by bisection of the inner joint member and the outer joint member. Therefore, the spherical contact with the outer and inner spherical surfaces of the cage is suppressed, and hence the joint is smoothly operated even under high load and in high speed rotation. As a result, heat generation is suppressed and durability is enhanced. The number of the balls is set to eight, and hence the joint can be downsized and light-weighted while load capacity is secured.

Further, the balls can be assembled two at a time, and hence assembly work hours can be markedly reduced. As a result, workability can be enhanced. In addition, the circumferential length of each of the pockets can be set to be smaller than a circumferential length thereof in the case where the balls are assembled one at a time. Thus, a circumferential length of each post between the pockets circumferentially adjacent to each other can be set to be large, and hence strength of the cage is stabilized.

In the ball assembly, the part between the two of the pockets, which allow the corresponding number of balls to be assembled therein at one time, may face corresponding one of the first portions of the end surface of the outer joint member, or may face corresponding one of the second portions thereof. In this way, assembly workability becomes excellent.

When the inner surface of the outer joint member is formed into a cylindrical surface, easiness of assembly of the cage into the outer joint member and processability are enhanced. As a result, production cost can be reduced and productivity can be enhanced. When a gap is formed between the inner surface of the outer joint member and the outer spherical surface of the cage, circulation of the lubricant is promoted. As a result, heat generation is suppressed and durability is enhanced.

When the outer surface of the inner joint member is formed into a cylindrical surface, easiness of assembly of the inner joint member into the cage and processability of the inner joint member are enhanced. As a result, production cost can be reduced and productivity can be enhanced. When a gap is formed between the outer surface of the inner joint member and the inner spherical surface of the cage, circulation of the lubricant is promoted. As a result, heat generation is suppressed and durability is enhanced.

When the center of curvature of the each of the eight track grooves of the outer joint member and the center of curvature of the each of the eight track grooves of the inner joint member are displaced in the direction away from the joint center, the eight track grooves of the outer joint member can be increased in size, and hence high load capacity can be secured. In addition, a thickness of the opening portion of the axial end portion of each of the eight track grooves of the inner joint member can be set to be large. As a result, the inner joint member can be stably coupled to a shaft to be fitted into a hole portion of the inner joint member. Further, when the center of curvature of the each of the eight track grooves of the outer joint member and the center of curvature of the each of the eight track grooves of the inner joint member are displaced in the direction closer with respect to the joint center, high load capacity of the each of the eight track grooves of the inner joint member can be secured, and a thickness of the outer joint member can be increased. As a result, stable strength can be obtained.

The eight track grooves of the outer joint member and the eight track grooves of the inner joint member may be formed through forging finishing, or through a machining process, in other words, may be subjected to a finishing process (grinding or quenched-steel trimming). In this way, various conventional forming methods (processing methods) can be widely selected as forming methods, and hence productivity becomes excellent.

DETAILED DESCRIPTION OF THE INVENTION

In the following, description is made of embodiments of the present invention with reference to the drawings.

Figure 1:
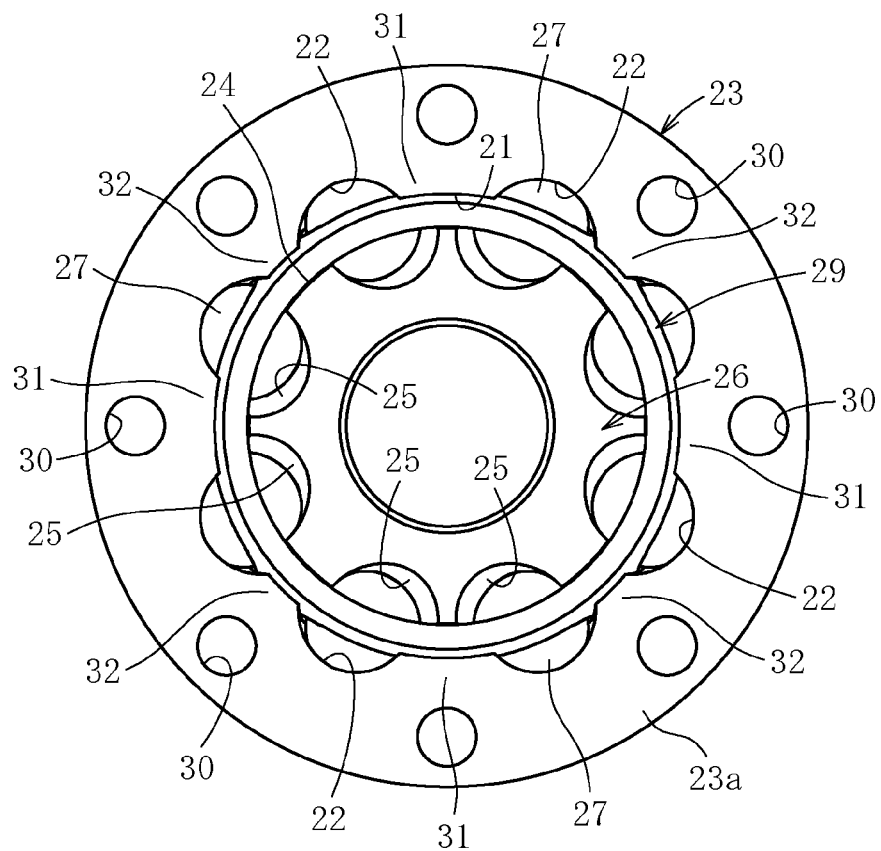
FIG. 1 is a front view of a first fixed type constant velocity universal joint according to an embodiment of the present invention.
Figure 6:
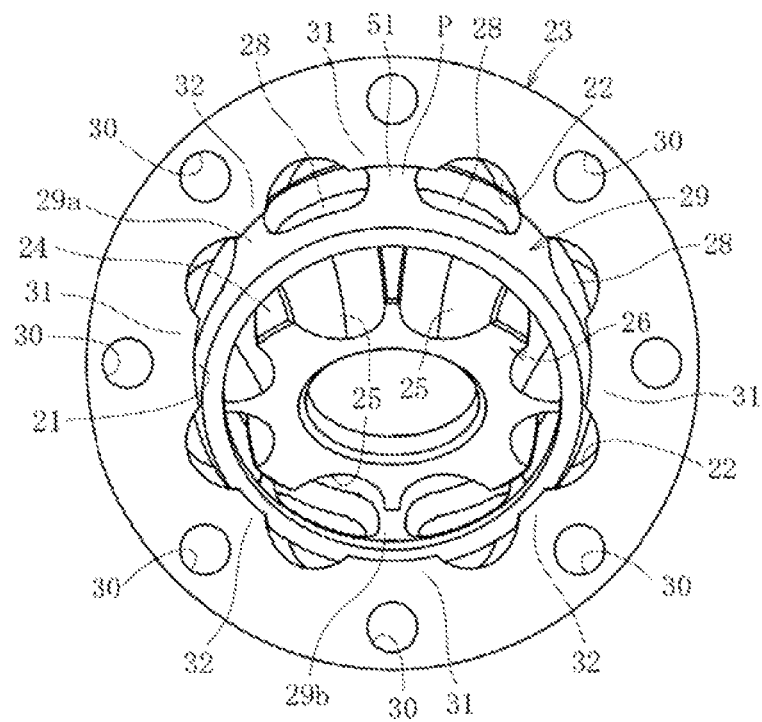
FIG. 6 is a front view illustrating a ball assembling state of the fixed type constant velocity universal joint illustrated in FIG. 1.
Figure 7:
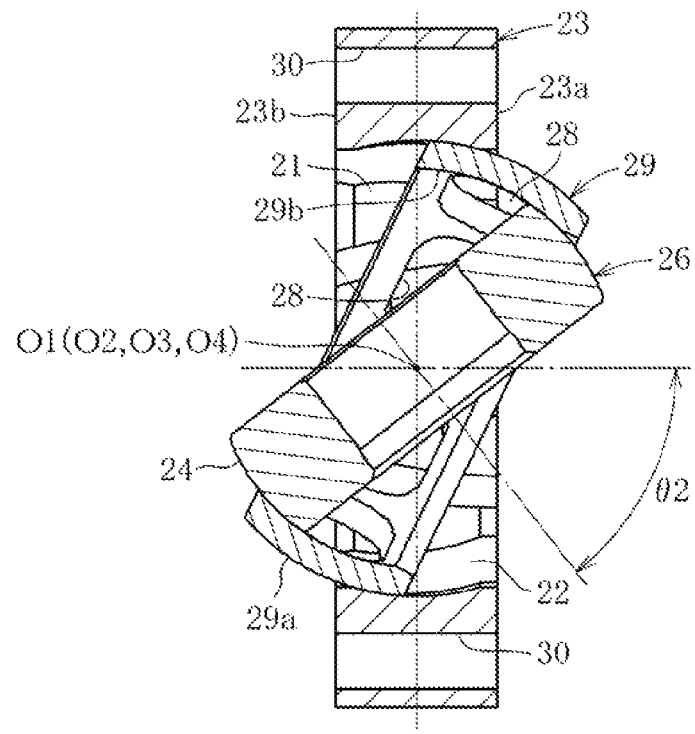
FIG. 7 is a sectional view illustrating the ball assembling state of the fixed type constant velocity universal joint illustrated in FIG. 1.

FIGS. 1, 6, and 7 illustrate a constant velocity universal joint according to the present invention. The constant velocity universal joint comprises, as a main part, an outer joint member 23 having an inner surface 21 provided with a plurality of track grooves 22, an inner joint member 26 having an outer surface 24 provided with a plurality of track grooves 25, a plurality of balls 27 arranged in ball tracks formed of the track grooves 22 of the outer joint member 23 and the track grooves 25 of the inner joint member 26 in cooperation with each other, and a cage 29 comprising pockets 28 for receiving the balls 27.

Further, as illustrated in FIG. 7, an offset in an axial direction between a center of curvature O1 of each of the track grooves 22 of the outer joint member 23 and a center of curvature O2 of the inner surface of the outer joint member 23, and an offset in the axial direction between a center of curvature O3 of each of the track grooves 25 of the inner joint member 26 and a center of curvature O4 of the outer surface of the inner joint member 26 are each set to zero.

Figure 2:
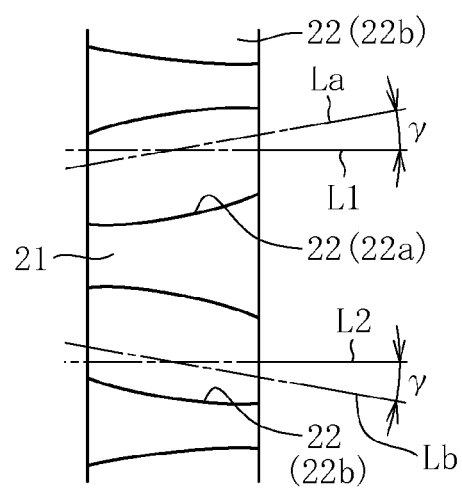
FIG. 2 is a schematic developed view of track grooves of an outer joint member of the fixed type constant velocity universal joint illustrated in FIG. 1.

As illustrated in FIG. 2, the track grooves 22 of the outer joint member 23 comprise track grooves 22a and 22b inclined in directions opposite to each other with respect to an axial line. An axial line La of each of the first track grooves 22a is inclined at a predetermined angle γ in a counterclockwise direction with respect to a straight line L1 parallel to a joint axial line. An axial line Lb of each of the second track grooves 22b is inclined at the predetermined angle γ in a clockwise direction with respect to a straight line L2 parallel to the joint axial line.

Figure 3:
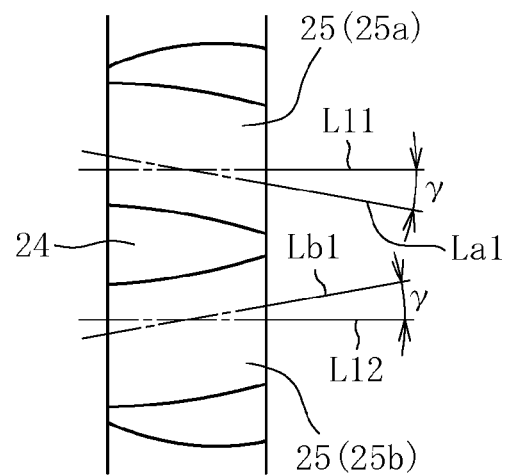
FIG. 3 is a schematic developed view of track grooves of an inner joint member of the fixed type constant velocity universal joint illustrated in FIG. 1.

As illustrated in FIG. 3, the track grooves 25 of the inner joint member 26 comprise track grooves 25a and 25b inclined in directions opposite to each other with respect to the axial line. Specifically, an axial line La1 of each of the first track grooves 25a is inclined at the predetermined angle γ in the clockwise direction with respect to a straight line L11 parallel to the joint axial line. An axial line Lb1 of each of the second track grooves 25b is inclined at the predetermined angle γ in the counterclockwise direction with respect to a straight line L12 parallel to the joint axial line.

In this way, the respective track grooves 22a and 22b and track grooves 25a and 25b of the outer joint member 23 and the inner joint member 26, which are inclined in the directions opposite to each other with respect to the axial line, are formed alternately to each other in a circumferential direction. Thus, the track grooves 22 of the outer joint member 23 and the track grooves 25 of the inner joint member 26 are maintained in a cross state.

Figure 5:
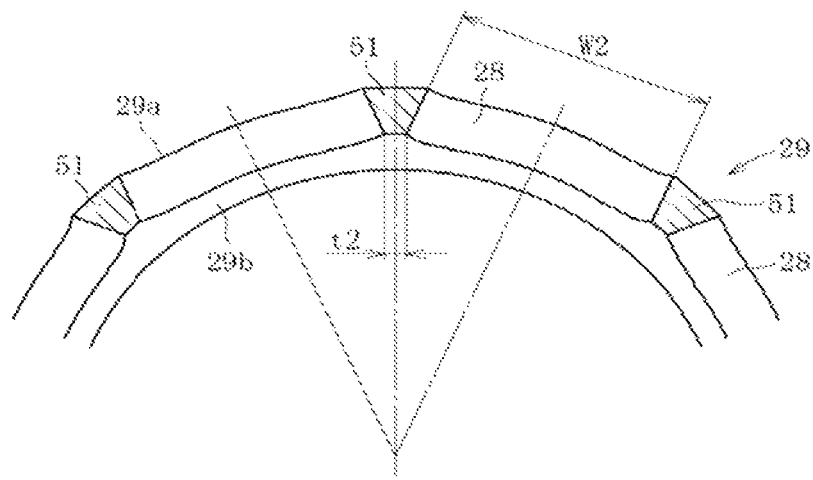
FIG. 5 is an enlarged sectional view of a main part of the cage of the fixed type constant velocity universal joint illustrated in FIG. 1.

Note that, the outer joint member 23 comprises through-holes 30 provided at a predetermined pitch along the circumferential direction. The through-holes 30 are configured to allow an end cap and a flexible boot to be mounted to the outer joint member 23. The cage 29 has a peripheral wall provided with the pockets 28 for holding the balls 27 at a predetermined pitch along the circumferential direction. In this case, as illustrated in FIG. 5, the peripheral wall has an outer surface as an outer spherical surface 29a and an inner surface as an inner spherical surface 29b.

By the way, circumferentially adjacent track grooves 22 of the outer joint member 23 are inclined in the directions opposite to each other. Thus, the outer joint member 23 comprises, at an end surface 23a (23b) thereof, first portions 31 that are large in distance between axial opening ends of the track grooves 22, and second portions 32 that are small in distance between the axial opening ends of the track grooves 22. The first portions 31 and the second portions 32 are arranged alternately to each other in the circumferential direction.

Figure 8:
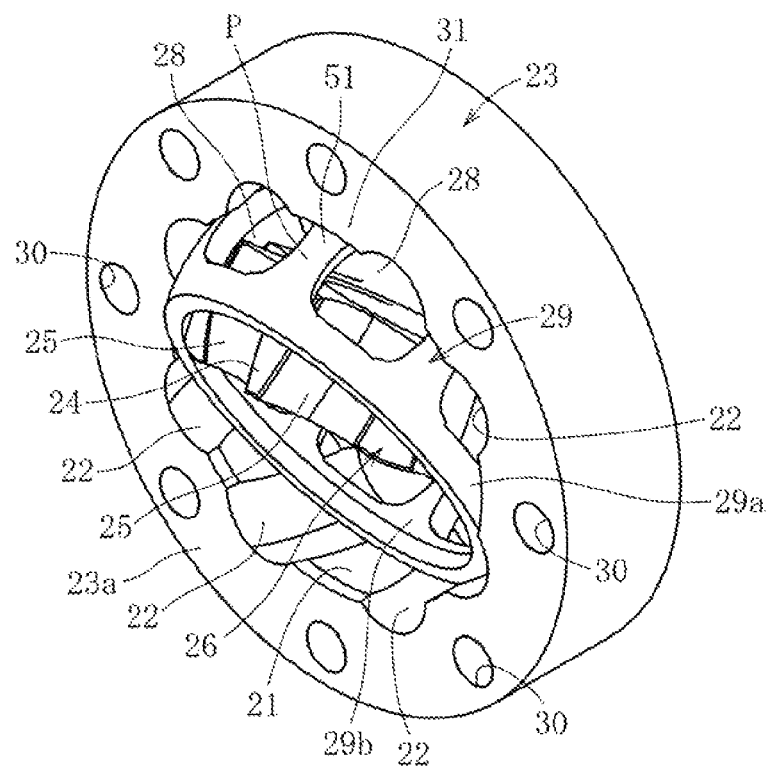
FIG. 8 is a perspective view illustrating the ball assembling state of the fixed type constant velocity universal joint illustrated in FIG. 1.

Next, description is made of a method of assembling the balls 27 into the fixed type constant velocity universal joint structured as described above. First, the inner joint member 26 and the cage 29 are assembled in the outer joint member 23. In this state, as illustrated in FIGS. 6 to 8, the inner joint member 26 and the cage 29 are inclined with respect to the outer joint member 23. At this time, two circumferentially adjacent pockets 28 are exposed from the outer joint member 23. In other words, the two pockets 28 are opened obliquely upward. Further, the inner joint member 26 is inclined with respect to the cage 29. Specifically, an angle θ2 is formed between an axial center of the inner joint member 26 and an axial center of the outer joint member 23.

Figure 42:
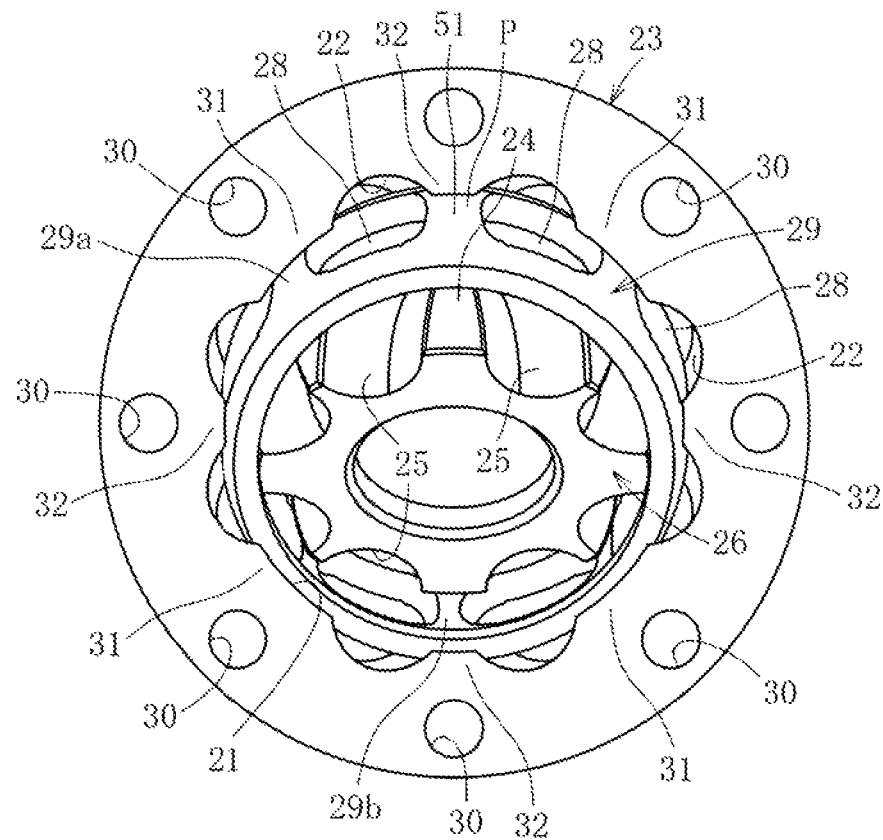
FIG. 42 is a front view illustrating a ball assembling state of the fixed type constant velocity universal joint illustrated in FIG. 1.

By the way, in this inclined state, the balls 27 can be assembled into the two exposed pockets 28. A circumferential length W2 (refer to FIG. 5) of each of the pockets 28 of the cage 29 is set so that the two pockets 28 allow the balls to be assembled therein at one time. Note that, in the example of the figure, a part P between the two pockets 28, each of which allows one of the balls 27 to be assembled therein, faces (corresponds to) one of the first portions 31. However, the present invention is not limited to this case, as illustrated in FIG. 42, a part P between the two pockets 28, each of which allows one of the balls 27 to be assembled therein, can face (correspond to) one of the second portions 32.

In this way, after the balls 27 are assembled into the two pockets 28, the entire joint is turned at approximately 90 degrees in the circumferential direction so that two other pockets 28 and 28 shifted at 90 degrees in the circumferential direction from the pockets 28 having the balls 27 assembled therein are opened obliquely upward. In this state, the balls 27 are assembled into the two other pockets 28 and 28 thus opened. After that, by performing the same step twice more, the balls 27 can be assembled into all the pockets 28.

Figure 9:
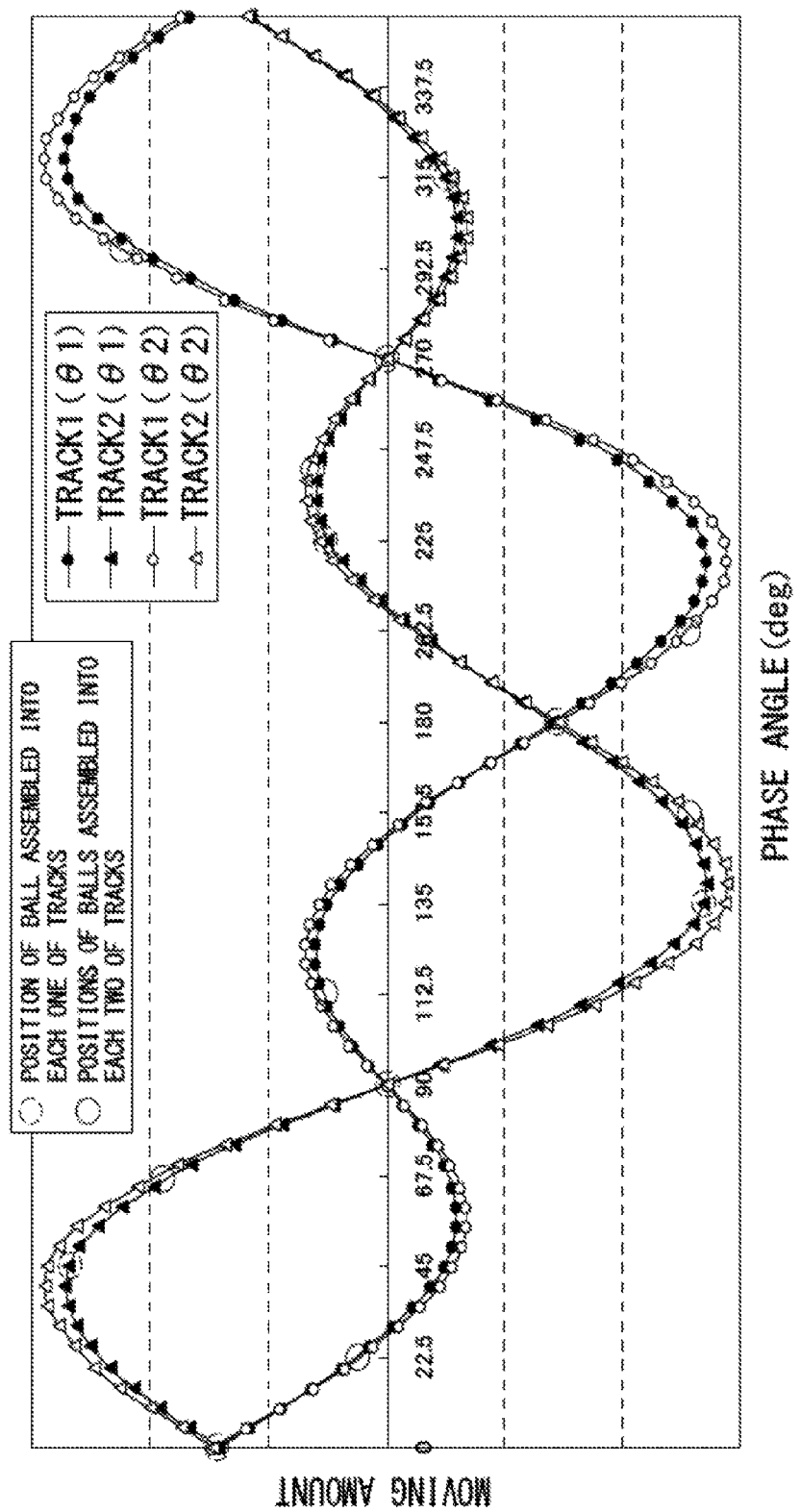
FIG. 9 is a graph showing moving amounts of balls of the fixed type constant velocity universal joint illustrated in FIG. 1.

By the way, FIG. 9 shows circumferential moving amounts of the balls 27 in a case where the balls are assembled one at a time into the pockets (assembly operating angle θ1), and the case where the balls are assembled at one time into the two pockets (assembly operating angle θ2).

Figure 10:
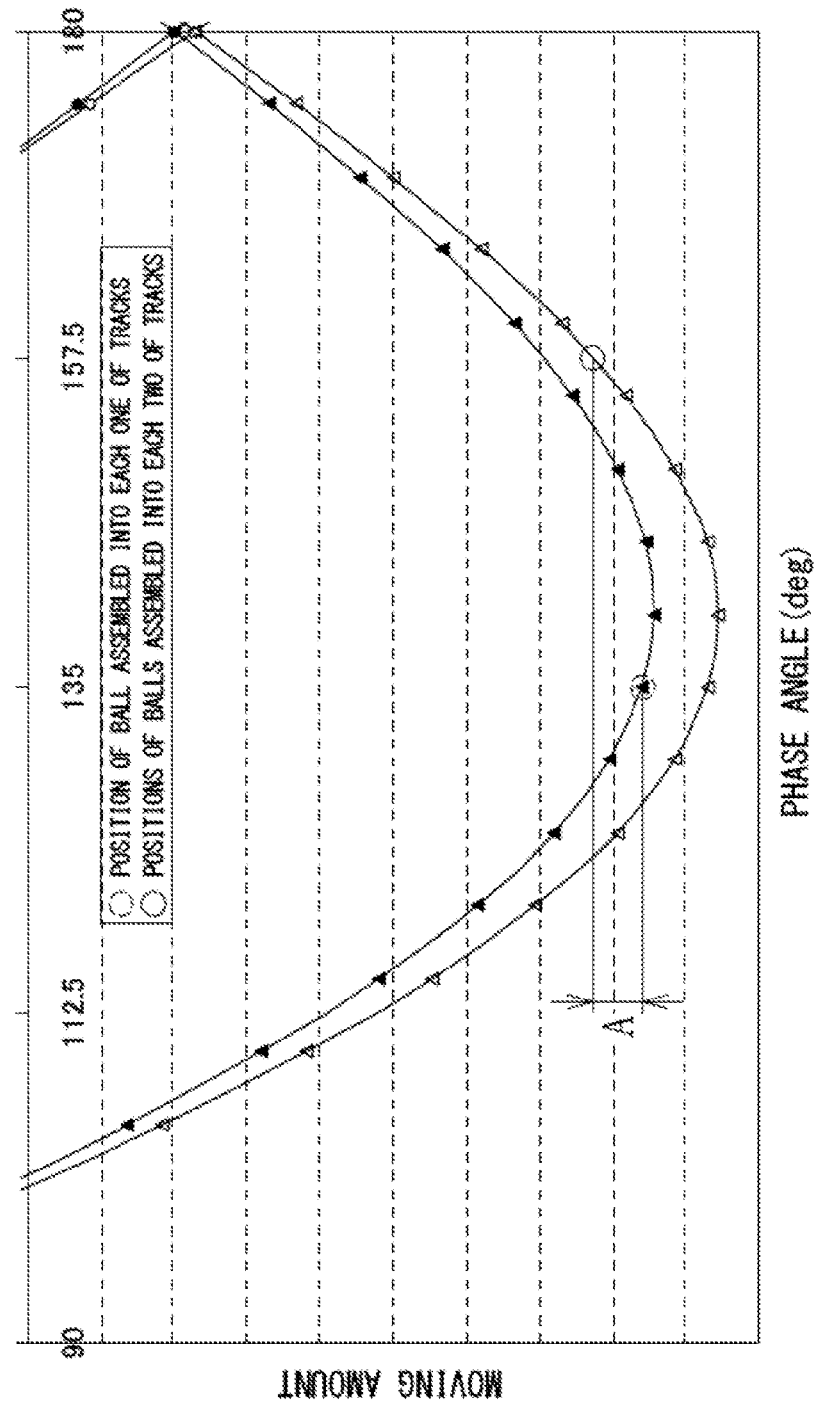
FIG. 10 is an enlarged graph showing a main part of wave forms of the moving amounts shown in the graph of FIG. 9.

In FIG. 9, hollow circular marks and hollow triangular marks represent the case where the balls are assembled two at a time, and solid circular marks and solid triangular marks represent the case where the balls are assembled one at a time. Further, solid line circular marks larger in diameter than the hollow circular marks each represent ball positions in the case where the balls are assembled two at a time, and broken line circular marks larger in diameter than the hollow circular marks each represent a ball position in the case where the balls 27 are assembled one at a time. FIG. 10 is an enlarged graph showing a main part of FIG. 9. As is understood from the enlarged graph, in the case where the balls 27 are assembled two at a time, circumferential moving amounts of each of balls 27 in the pockets 28 are smaller by a dimension A.

According to the present invention, the track offsets are each set to zero, the adjacent track grooves 22a and 22b and the adjacent track grooves 25a and 25b are alternately intersected with each other, and forces are applied alternately to the pockets 28 adjacent to each other. In this way, wedge angles are formed alternately in the opposite directions. Thus, a position of the cage is stabilized within planes obtained by bisection of the inner joint member 26 and the outer joint member 23. In this way, spherical contact with the outer spherical surface 29a and the inner spherical surface 29b of the cage is suppressed, and hence the constant velocity universal joint is smoothly operated even under high load and in high speed rotation. As a result, heat generation is suppressed and durability is enhanced. The number of the balls is set to eight, and hence the constant velocity universal joint can be downsized and light-weighted while load capacity is secured.

In addition, in an assembly step, the balls 27 can be assembled at one time into the two pockets 28. Thus, when the balls are assembled two at a time, all the eight balls are assembled by performing the assembly of two balls four times in total. In this way, assembly work hours can be markedly reduced, and hence workability can be enhanced.

Figure 4:
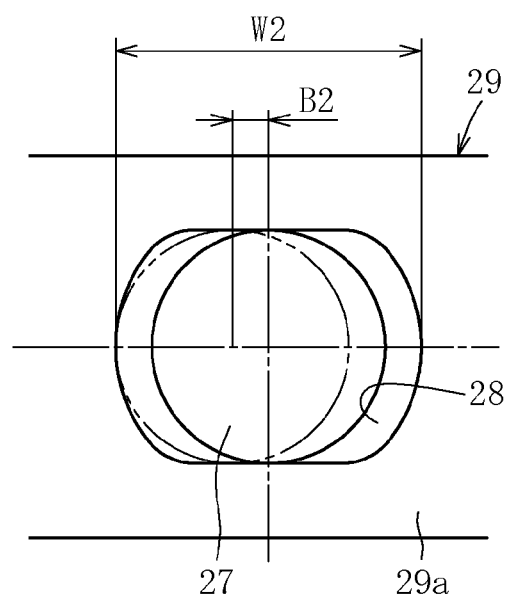
FIG. 4 is an enlarged developed view of a main part of a cage of the fixed type constant velocity universal joint illustrated in FIG. 1.
Figure 36:
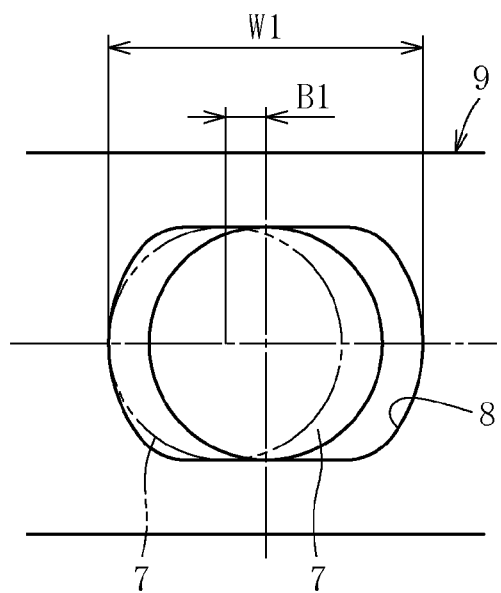
FIG. 36 is a developed view of a main part of a cage of the fixed type constant velocity universal joint of FIG. 33.
Figure 37:
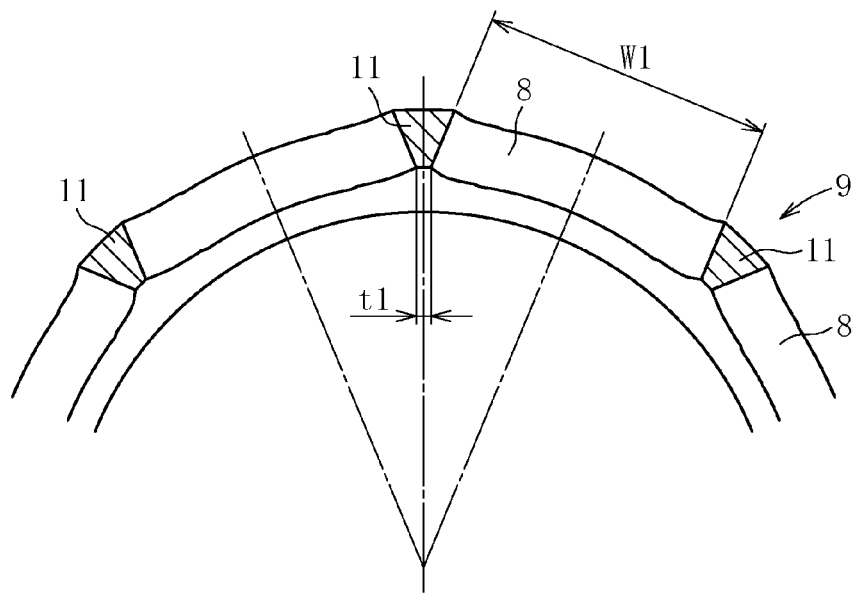
FIG. 37 is an enlarged sectional view of a main part of the cage of the fixed type constant velocity universal joint of FIG. 33.
Figure 38:
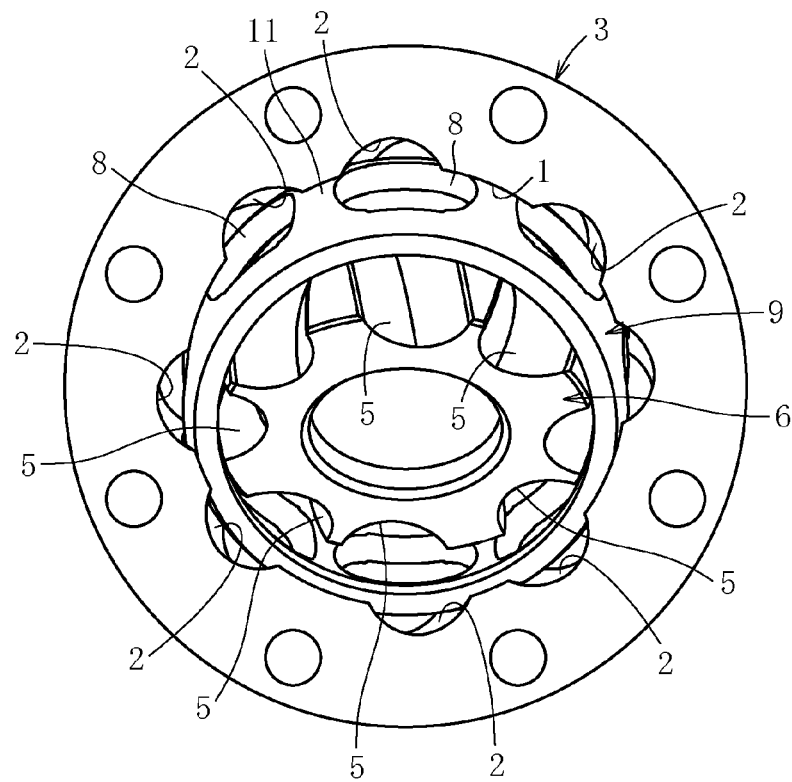
FIG. 38 is a front view of a ball assembling state of the fixed type constant velocity universal joint of FIG. 33.
Figure 39:
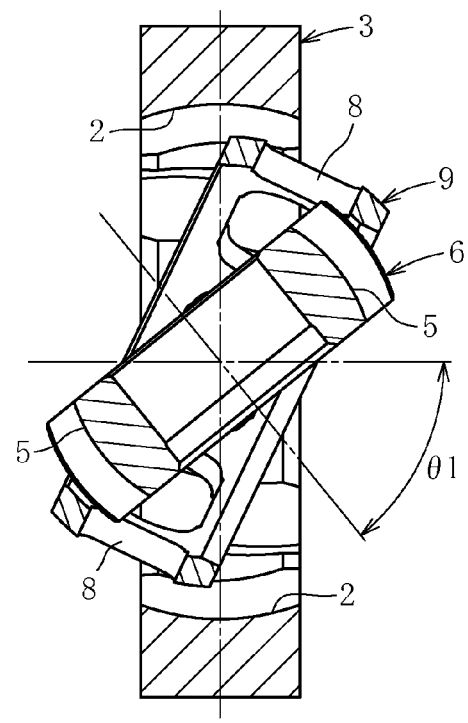
FIG. 39 is a sectional view of the ball assembling state of the fixed type constant velocity universal joint of FIG. 33.
Figure 40:
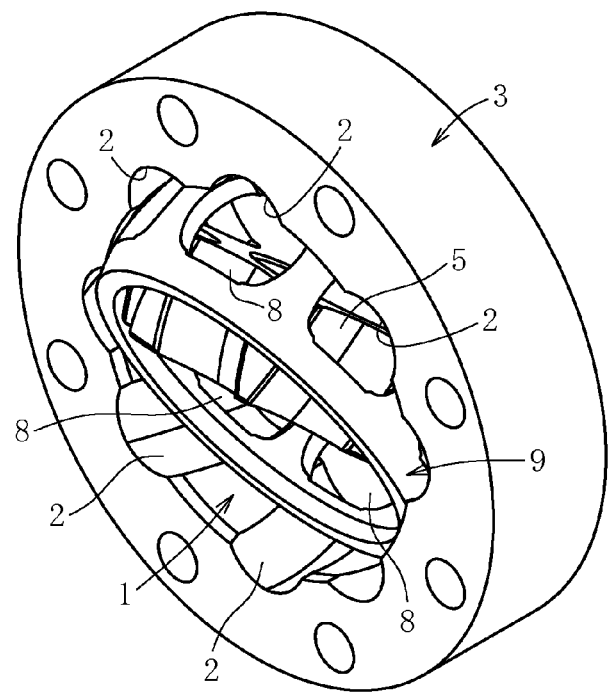
FIG. 40 is a perspective view of the ball assembling state of the fixed type constant velocity universal joint of FIG. 33.
Figure 41:
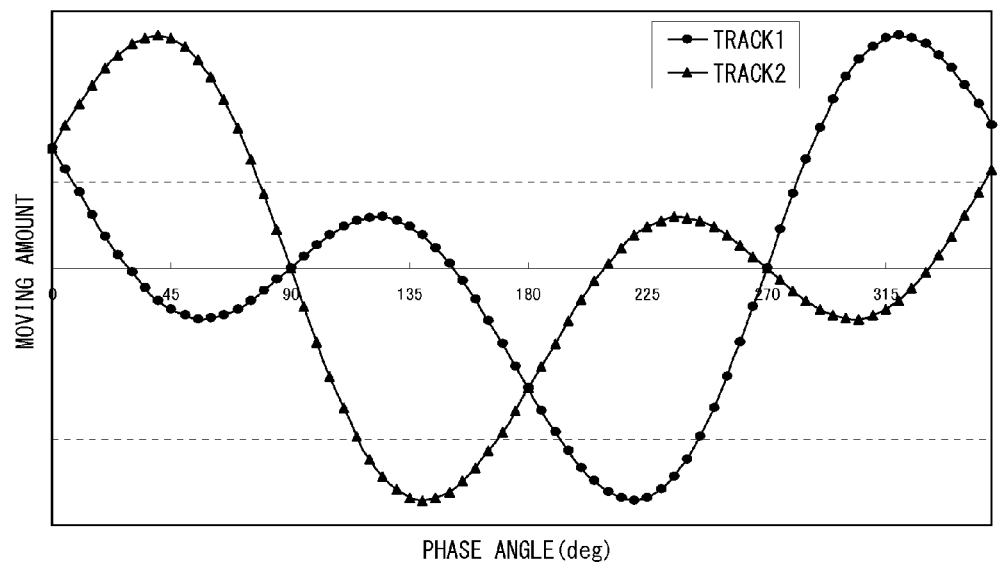
FIG. 41 is a graph showing moving amounts of balls of the fixed type constant velocity universal joint of FIG. 33.

In addition, a circumferential moving amount B2 (refer to FIG. 4) of the ball 27 in the pocket 28 out of phase in the circumferential direction with the two assembling pockets 28 can be set to be smaller than a circumferential moving amount B1 (refer to FIG. 36) of a ball 7 in the case where the balls are assembled one at a time. Thus, a circumferential length of each of the pockets 28 can be set to be smaller than a circumferential length thereof in the case where the balls are assembled one at a time. In other words, t2 (in this case, thicknesses on a radially inner side) of each post portion 51 between the pockets of the cage 29 according to the present invention is larger than a circumferential thickness t1 of each conventional post portion 11 illustrated in FIG. 37, and hence strength of the cage 29 is stabilized.

Figure 11:
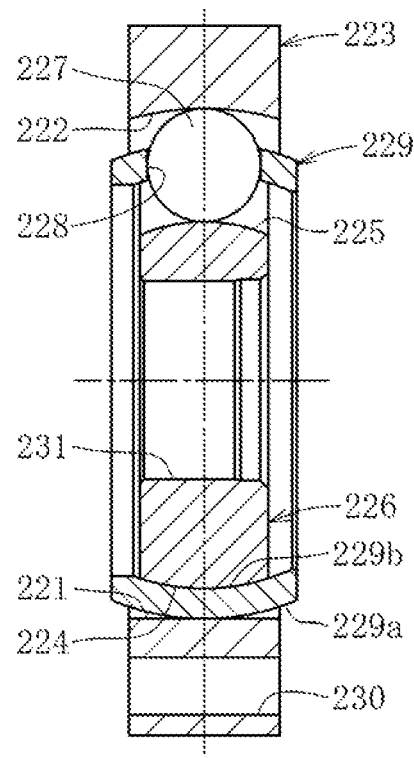
FIG. 11 is a sectional view of a second fixed type constant velocity universal joint according to another embodiment of the present invention.
Figure 12:
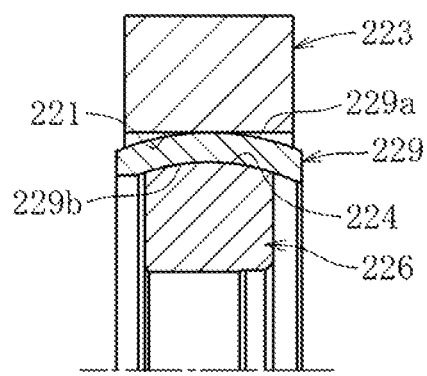
FIG. 12 is a sectional view of a main part of the fixed type constant velocity universal joint illustrated in FIG. 11.

Next, FIG. 11 illustrates a second constant velocity universal joint. In this case, as illustrated in FIG. 12, the inner surface 221 of the outer joint member 223 is formed into a cylindrical surface. In this way, when the inner surface 221 of the outer joint member 223 is a cylindrical surface, the cage 229 can be assembled into the outer joint member 223 only through insertion under a state in which the axial center of the outer joint member 223 and an axial center of the cage 229 are aligned with each other. In this case, the cage 229 can be inserted into the outer joint member 223 irrespective of a positional relationship between positions of the track grooves of the outer joint member 223 and positions of the pockets 228 of the cage 229. Thus, assembly work can be facilitated.

Further, in this constant velocity universal joint, the outer spherical surface 229a of the cage 229 is not substantially held in contact with the inner surface 221 of the outer joint member 223, and hence circulation of a lubricant is promoted. As a result, heat generation is suppressed and durability is enhanced. In addition, a finishing process (grinding or quenched-steel trimming) need not be performed on the inner surface 221 of the outer joint member 223 or the outer spherical surface 229a of the cage 229. In other words, the inner surface 221 of the outer joint member 223 and the outer spherical surface 229a of the cage 229 may each remain to be a rough forged surface. In this way, the finishing process can be omitted, and hence cost can be reduced and productivity can be enhanced. Note that, the track grooves 222 and 225 may be formed through forging finishing, or through a machining process, in other words, may be subjected to the finishing process (grinding or quenched-steel trimming).

Figure 13:
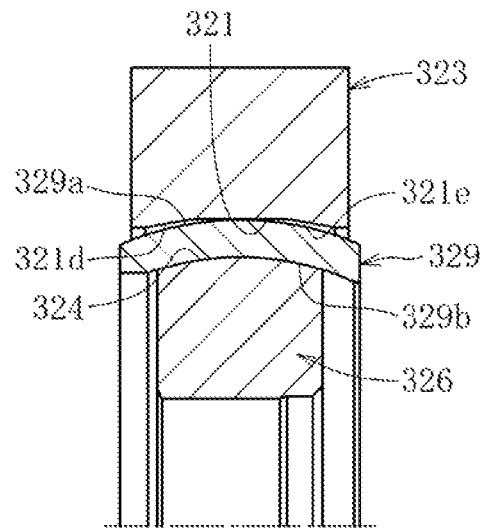
FIG. 13 is a sectional view of a third fixed type constant velocity universal joint according to still another embodiment of the present invention.

Next, FIG. 13 illustrates a third fixed type constant velocity universal joint. The outer joint member 323 in this case is different from the outer joint member 323 illustrated in FIG. 11 (outer joint member having the cylindrical inner surface 321) in comprising tapered portions 321d and 321e provided at both opening portions and gradually reduced in diameter toward respective opening sides.

Figure 14:
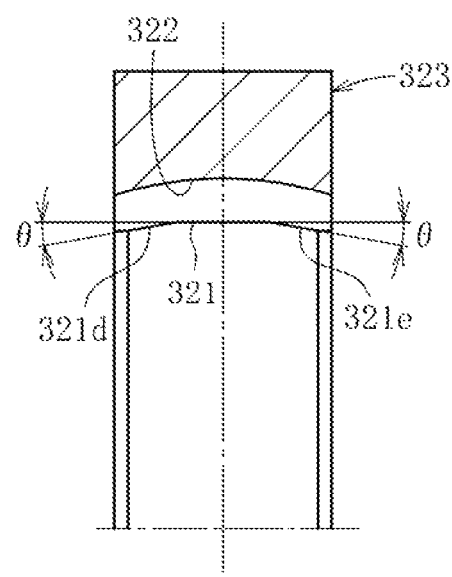
FIG. 14 is a sectional view of an outer joint member of the fixed type constant velocity universal joint illustrated in FIG. 13.

The tapered portions 321d and 321e are each provided at a taper angle θ (refer to FIG. 14) set to an extent that, as illustrated in FIG. 13, the tapered portion 321d and 321e are kept out of contact with the outer spherical surface 329a of the cage 329 at the time of assembly. Thus, the outer spherical surface 329a of the cage 329 is not substantially held in contact with the inner surface 321 of the outer joint member 323.

In this way, the fixed type constant velocity universal joints illustrated, for example, in FIGS. 11 and 13 have the same functions and advantages as those of the fixed type constant velocity universal joint illustrated, for example, in FIG. 1.

Figure 15:
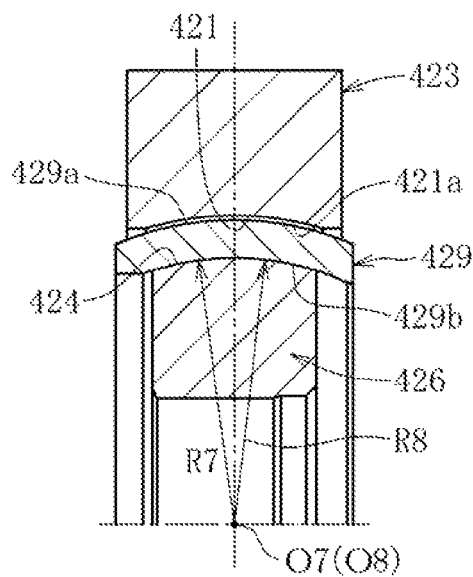
FIG. 15 is a sectional view of a fourth fixed type constant velocity universal joint according to yet another embodiment of the present invention.
Figure 16:
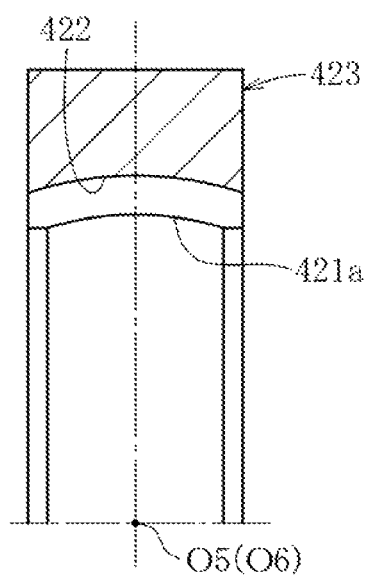
FIG. 16 is a sectional view of an outer joint member of the fixed type constant velocity universal joint illustrated in FIG. 15.

Next, FIG. 15 illustrates a fourth fixed type constant velocity universal joint. The inner surface 421 of the outer joint member 423 is formed into a spherical surface 421a that forms a gap between the spherical surface 421a and the outer spherical surface 429a of the cage 429. In this case, as illustrated in FIG. 16, a center of curvature O5 of the spherical surface 421a and a center of curvature O6 of each of the track grooves 422 are aligned with each other.

The outer surface 424 of the inner joint member 426 of the fixed type constant velocity universal joint using this outer joint member 423 has a center of curvature O7 aligned with a center of curvature O8 of the inner spherical surface 429b of the cage 429, and has a radius of curvature R7 substantially equal to a radius of curvature R8 of the inner spherical surface 429b. With this, the inner spherical surface 429b of the cage 429 and the outer surface 424 of the inner joint member 426 are held in sliding contact with each other.

Figure 17:
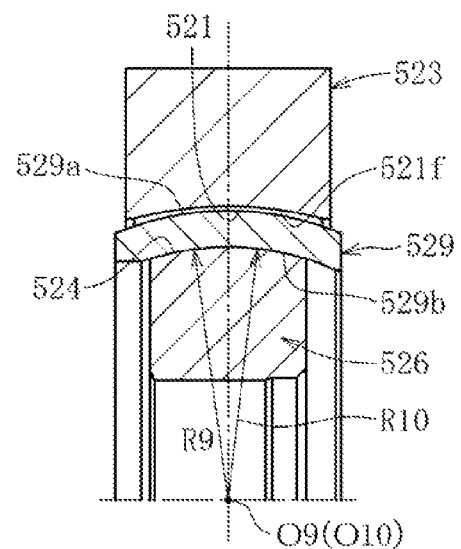
FIG. 17 is a sectional view of a fifth fixed type constant velocity universal joint according to yet another embodiment of the present invention.
Figure 18:
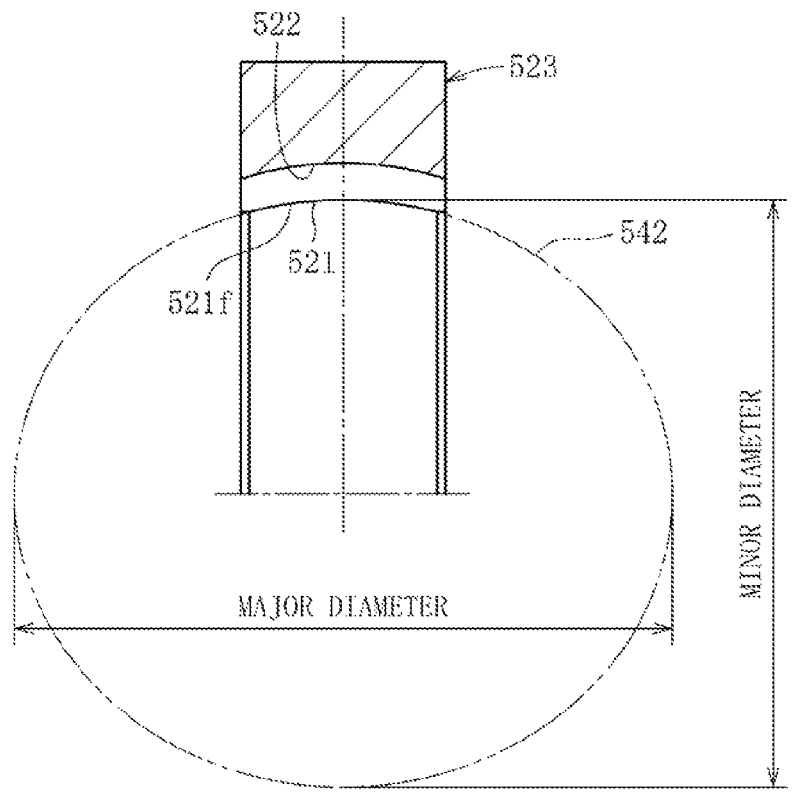
FIG. 18 is a sectional view of an outer joint member of the fixed type constant velocity universal joint illustrated in FIG. 17.

Next, FIG. 17 illustrates a fifth fixed type constant velocity universal joint. The inner surface 521 of the outer joint member 523 is formed into an elliptical surface 521f that forms a gap between the elliptical surface 521f and the outer spherical surface 529a of the cage 529. In other words, the elliptical surface 521f is formed along an elliptical spherical surface of an ellipse 542 indicated by a two-dot chain line in FIG. 18.

The outer surface 524 of the inner joint member 526 of the fixed type constant velocity universal joint using this outer joint member 523 has the center of curvature O9 aligned with the center of curvature O10 of the inner spherical surface 529b of the cage 529, and has the radius of curvature R9 substantially equal to the radius of curvature R10 of the inner spherical surface 529b. With this, the inner spherical surface 529b of the cage 529 and the outer surface 524 of the inner joint member 526 are held in sliding contact with each other.

In this way, the gap is formed between the inner surface 521 of the outer joint member 523 and the outer spherical surface 529a of the cage 529, and hence circulation of the lubricant is promoted. As a result, heat generation is suppressed and durability is enhanced. Further, the inner spherical surface 529b of the cage 529 and the outer surface 524 of the inner joint member 526 are held in sliding contact with each other, and hence the cage is accurately positioned. Even when the cage 529 is not held by the outer joint member 523, a function of the fixed type constant velocity universal joint can be stably exerted.

Figure 19:
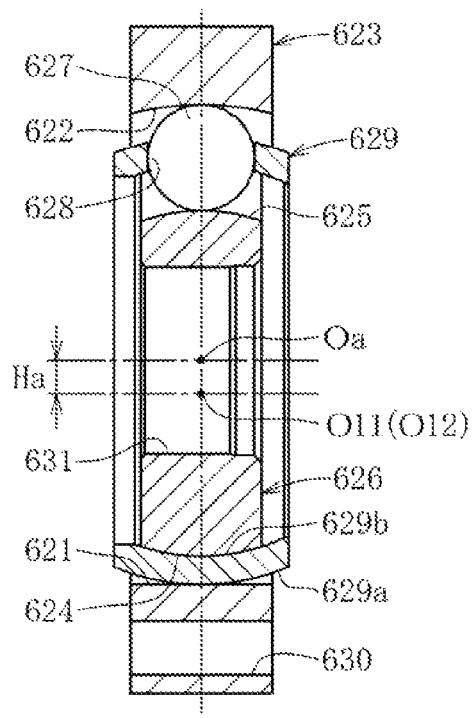
FIG. 19 is a sectional view of a sixth fixed type constant velocity universal joint according to yet another embodiment of the present invention.
Figure 20:
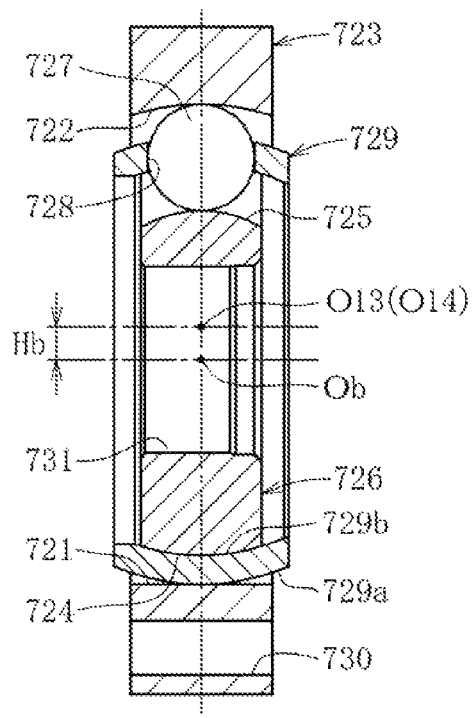
FIG. 20 is a sectional view of a seventh fixed type constant velocity universal joint according to yet another embodiment of the present invention.

Next, FIG. 19 illustrates a sixth fixed type constant velocity universal joint, and FIG. 20 illustrates a seventh fixed type constant velocity universal joint. In those fixed type constant velocity universal joints, the centers of curvature O11 and O13 of each of the track grooves 622 and 722 of the outer joint members 623 and 723 and the centers of curvatures O12 and O14 of each of the track grooves 625 and 725 of the inner joint members 626 and 726 are shifted in the radial direction from joint centers Oa and Ob. In FIG. 19, the centers of curvatures O11 and O12 are shifted to a position away from the joint center Oa by an offset amount Ha with respect to the joint center Oa. Further, in FIG. 20, the centers of curvature O13 and O14 are shifted to a position closer with respect to the joint center Ob by the offset amount Hb with respect to the joint center Ob.

Figure 21:
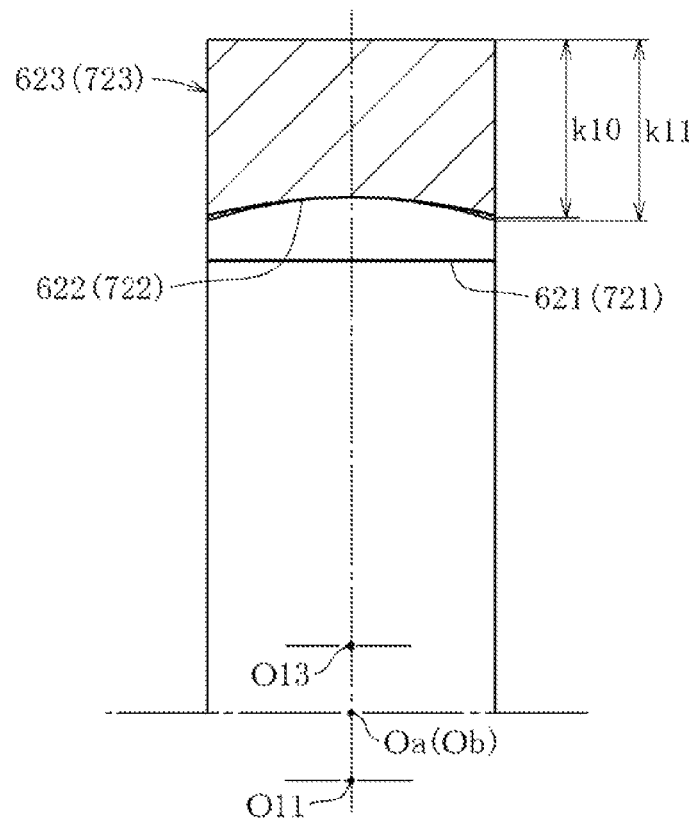
FIG. 21 is a sectional view of an outer joint member under a state in which a center of curvature of a track groove is offset in a radial direction.
Figure 22:
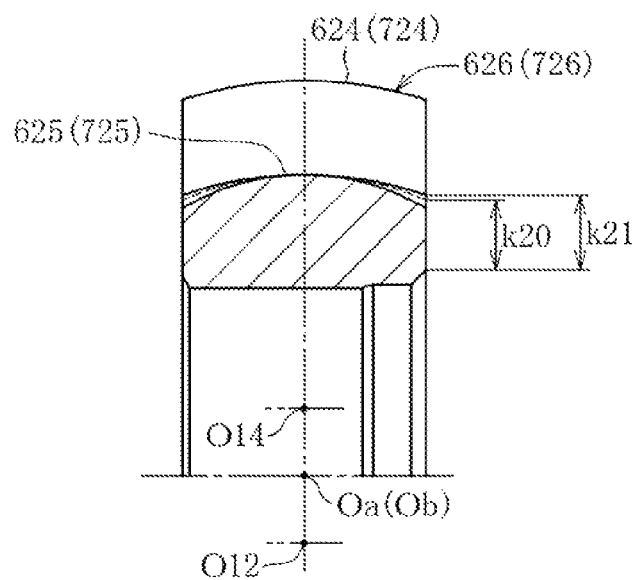
FIG. 22 is a sectional view of an inner joint member under a state in which a center of curvature of a track groove is offset in the radial direction.

FIG. 21 illustrates the outer joint members 623 and 723 in a case where the center of curvature O11 is arranged at a position away from the joint center Oa, and in a case where the center of curvature O13 is arranged at a position closer with respect to the joint center Ob. In FIG. 21, reference symbol O11 represents a center of curvature of each of the track grooves 622 of the outer joint member 623, which is arranged at the position away from the joint center Oa, and reference symbol O13 represents a center of curvature of each of the track grooves 722 of the outer joint member 723, which is arranged at the position closer with respect to the joint center Ob. Further, FIG. 22 illustrates the inner joint members 626 and 726 in a case where the center of curvature O12 is arranged at a position away from the joint center Oa, and in a case where the center of curvature O12 is arranged at a position closer with respect to the joint center Ob. In FIG. 22, reference symbol O12 represents a center of curvature of each of the track grooves 625 of the inner joint member 626, which is arranged at the position away from the joint center Oa, and reference symbol O14 represents a center of curvature of each of the track grooves 725 of the inner joint member 726, which is arranged at the position closer with respect to the joint center Ob.

When the center of curvature O11 of each of the track grooves 622 of the outer joint member 623 and the center of curvature O12 of each of the track grooves 625 of the inner joint member 626 are displaced in the direction away from the joint center Oa, the track grooves 622 of the outer joint member 623 can be increased in size, and hence high load capacity can be secured. In addition, a thickness of the opening portion of the axial end portion of each of the track grooves 625 of the inner joint member 626 can be set to be large. As a result, the inner joint member 626 can be stably coupled to a shaft to be fitted into a hole portion of the inner joint member 626. Further, when the center of curvature O13 of each of the track grooves 722 of the outer joint member 723 and the center of curvature O14 of each of the track grooves 725 of the inner joint member 726 are displaced in the direction closer with respect to the joint center Ob, high load capacity of each of the track grooves 725 of the inner joint member 726 can be secured, and a thickness of the outer joint member 723 can be increased. As a result, stable strength can be obtained.

Note that, in FIG. 21, reference symbol k10 represents an outer joint member thickness of an axial end portion of each of the track grooves in a case where the center of curvature of each of the track grooves is aligned with the joint centers Oa and Ob, and reference symbol k11 represents an outer joint member thickness of the axial end portion of each of the track grooves 722 in a case where the center of curvature O13 of each of the track grooves 722 is displaced in the direction closer with respect to the joint center Ob. Further, in FIG. 22, reference symbol k20 represents an inner joint member thickness of an axial end portion of each of the track grooves in a case where the center of curvature of each of the track grooves is aligned with the joint centers Oa and Ob, and reference symbol k21 represents an inner joint member thickness of the axial end portion of each of the track grooves 625 in a case where the center of curvature O12 of each of the track grooves 625 is spaced away from the joint center Oa.

Figure 23:
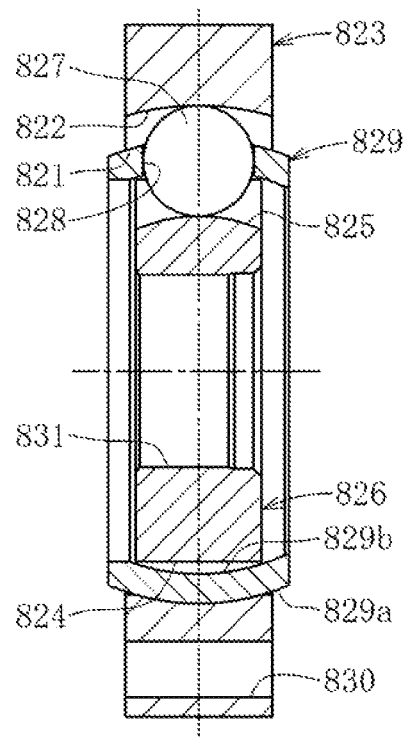
FIG. 23 is a sectional view of an eighth fixed type constant velocity universal joint according to yet another embodiment of the present invention.
Figure 24:
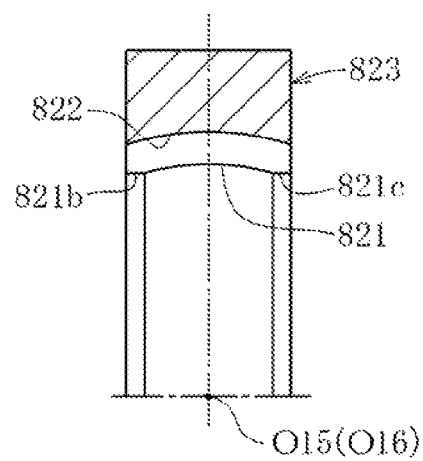
FIG. 24 is a sectional view of an outer joint member of the fixed type constant velocity universal joint illustrated in FIG. 23.

FIG. 23 illustrates an eighth constant velocity universal joint. The inner surface 821 of the outer joint member 823 is formed into a spherical surface, and the outer surface 824 of the inner joint member 826 is formed into a cylindrical surface. Thus, a gap is formed between the outer surface 824 of the inner joint member 826 and the inner spherical surface 829b of the cage 829. Further, as illustrated in FIG. 24, a center of curvature O15 of the inner surface 821 of the outer joint member 823 is aligned with the center of curvature O16 of each of the track grooves 822 of the outer joint member 823. Note that, as illustrated in FIG. 24, cutout portions 821b and 821c are provided at both axial end portions of the inner surface 821 of the outer joint member 823.

Figure 25:
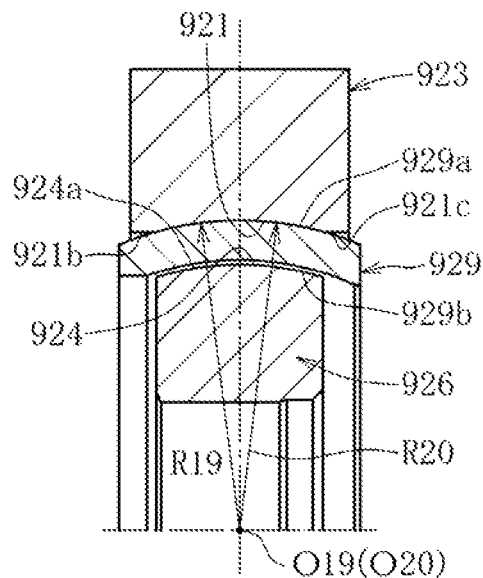
FIG. 25 is a sectional view of a ninth fixed type constant velocity universal joint according to yet another embodiment of the present invention.
Figure 26:
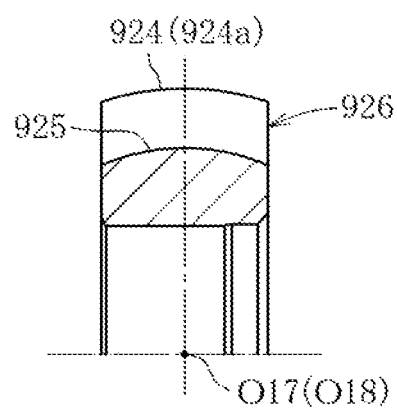
FIG. 26 is a sectional view of an inner joint member of the fixed type constant velocity universal joint illustrated in FIG. 25.

FIG. 25 illustrates a ninth fixed type constant velocity universal joint. The outer surface 924 of the inner joint member 926 is formed into a spherical surface 924a that forms a gap between the spherical surface 924a and the inner spherical surface 929b of the cage 929. In this case, as illustrated in FIG. 26, the center of curvature O17 of the spherical surface 924a and the center of curvature O18 of each of the track grooves 925 are aligned with each other.

As illustrated in FIG. 25, the inner surface 921 of the outer joint member 923 of the fixed type constant velocity universal joint using this inner joint member 926 has the center of curvature O19 aligned with the center of curvature O20 of the outer spherical surface 929a of the cage 929, and has a radius of curvature R19 substantially equal to a radius of curvature R20 of the outer spherical surface 929b. With this, the outer spherical surface 929a of the cage 929 and the inner surface 921 of the outer joint member 923 are held in sliding contact with each other. Note that, the cutout portions 921b and 921c are provided at both the axial end portions of the inner surface 921 of the outer joint member 923.

Figure 27:
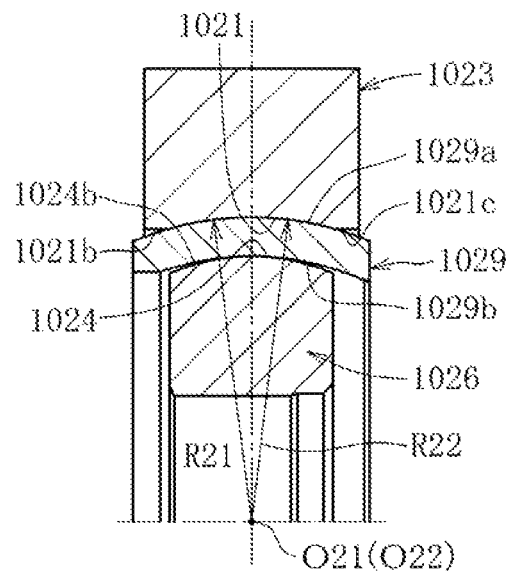
FIG. 27 is a sectional view of a tenth fixed type constant velocity universal joint according to yet another embodiment of the present invention.
Figure 28:
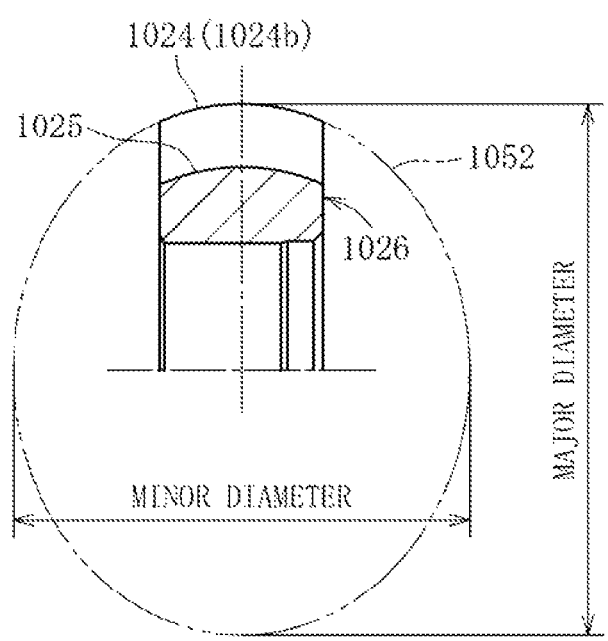
FIG. 28 is a sectional view of an inner joint member of the fixed type constant velocity universal joint illustrated in FIG. 27.

Next, FIG. 27 illustrates a tenth fixed type constant velocity universal joint. The outer surface 1024 of the inner joint member 1026 is formed into an elliptical surface 1024b that forms a gap between the elliptical surface 1024b and the inner spherical surface 1029b of the cage 1029. In other words, the elliptical surface 1024b is formed along an elliptical spherical surface of an ellipse 1052 indicated by a two-dot chain line in FIG. 28.

The inner surface 1021 of the outer joint member 1023 of the fixed type constant velocity universal joint using this inner joint member 1026 has the center of curvature O21 aligned with the center of curvature O22 of the outer spherical surface 1029a of the cage 1029, and has the radius of curvature R21 substantially equal to the radius of curvature R22 of the outer spherical surface 1029a. With this, the outer spherical surface 1029a of the cage 1029 and the inner surface 1021 of the outer joint member 1023 are held in sliding contact with each other.

In this way, the gap is formed between the outer surface 1024 (1024b) of the inner joint member 1026 and the inner spherical surface 1029b of the cage 1029, and hence circulation of the lubricant is promoted. As a result, heat generation is suppressed and durability is enhanced. Further, the outer spherical surface 1029a of the cage 1029 and the inner surface 1021 of the outer joint member 1023 are held in sliding contact with each other, and hence the cage is accurately positioned. Even when the cage 1029 is not held by the inner joint member 1026, the function of the fixed type constant velocity universal joint can be stably exerted.

Figure 29:
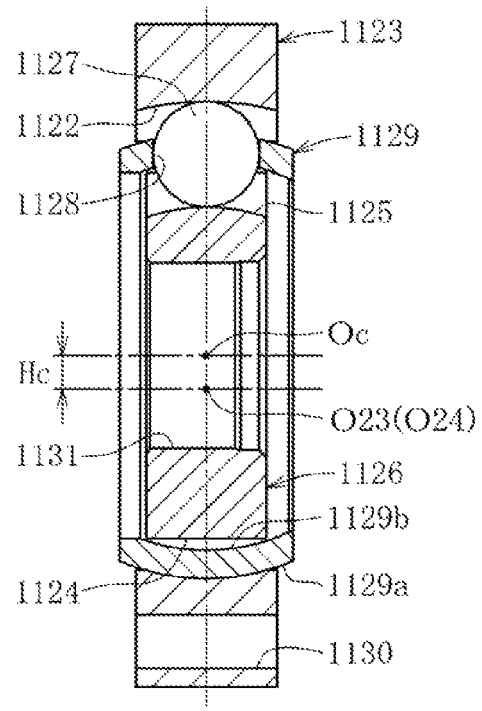
FIG. 29 is a sectional view of an eleventh fixed type constant velocity universal joint according to yet another embodiment of the present invention.
Figure 30:
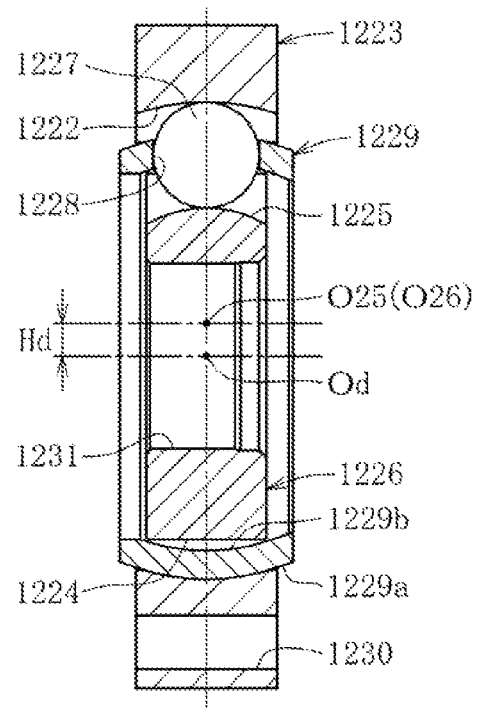
FIG. 30 is a sectional view of a twelfth fixed type constant velocity universal joint according to yet another embodiment of the present invention.

Next, FIG. 29 illustrates an eleventh fixed type constant velocity universal joint, and FIG. 30 illustrates a twelfth fixed type constant velocity universal joint. In the case of forming the outer surfaces 1124 and 1224 of the inner joint members 1126 and 1226 into a cylindrical surface, the centers of curvature O23 and O25 of each of the track grooves 1122 and 1222 of the outer joint members 1123 and 1223 and the centers of curvature O24 and O26 of each of the track grooves 1125 and 1225 of the inner joint members 1126 and 1226 are shifted in the radial direction from the joint centers Oc and Od. In FIG. 29, the centers of curvature O23 and O24 are shifted to a position away from the joint center Oc by the offset amount Hc with respect to the joint center Oc. Further, in FIG. 30, the centers of curvature O25 and O26 are shifted to a position closer with respect to the joint center Od by the offset amount Hd with respect to the joint center Od.

Figure 31:
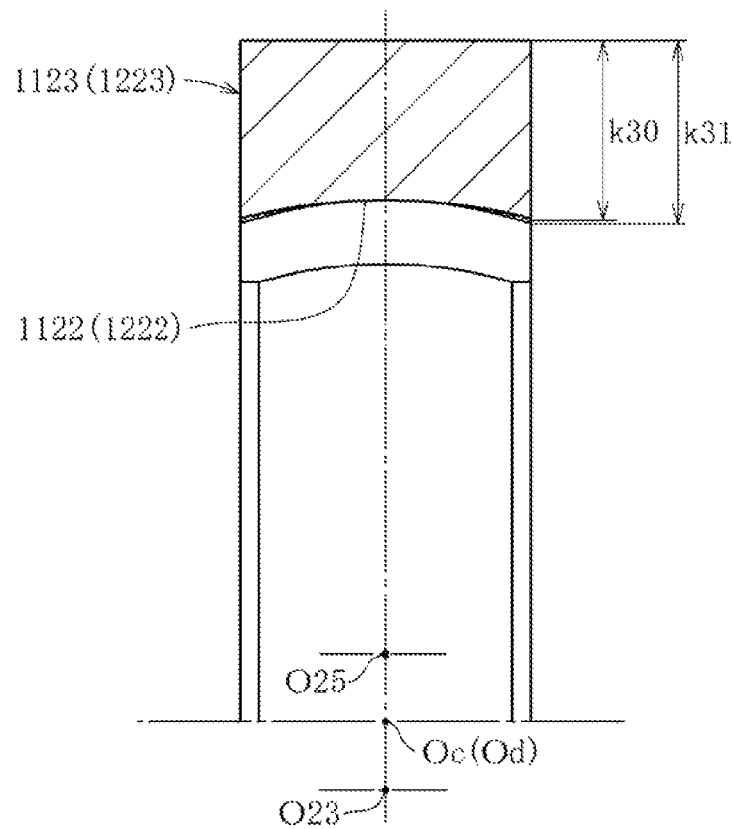
FIG. 31 is a sectional view of an outer joint member under a state in which a center of curvature of a track groove is offset in the radial direction.
Figure 32:
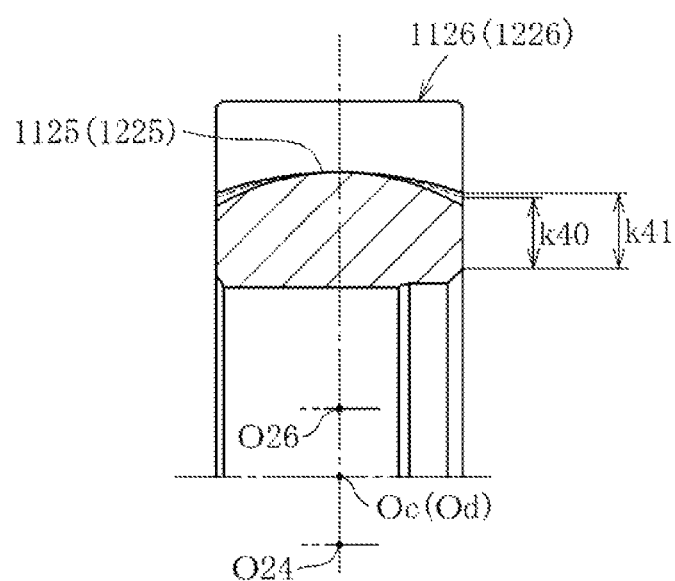
FIG. 32 is a sectional view of an inner joint member under a state in which a center of curvature of a track groove is offset in the radial direction.
Figure 33:
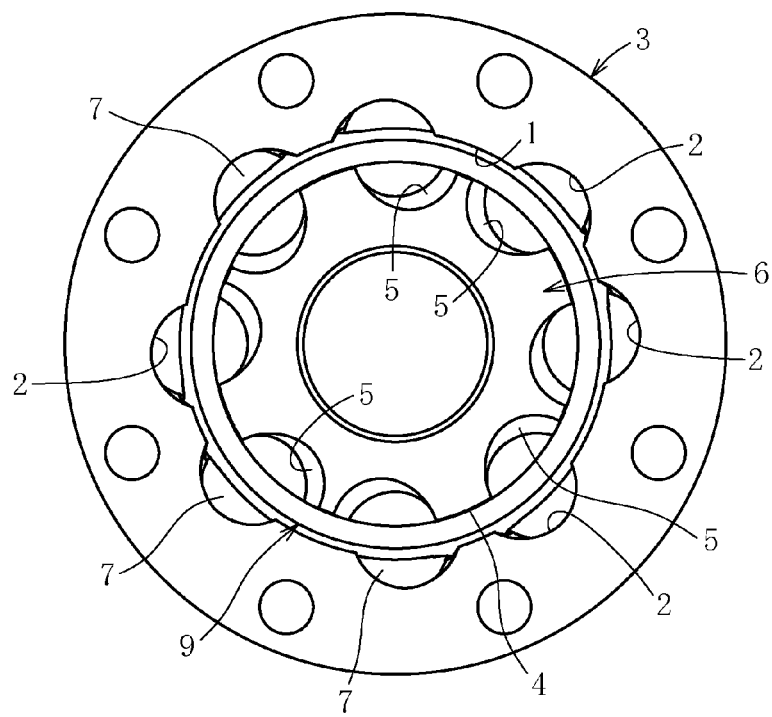
FIG. 33 is a front view of a conventional fixed type constant velocity universal joint.
Figure 34:
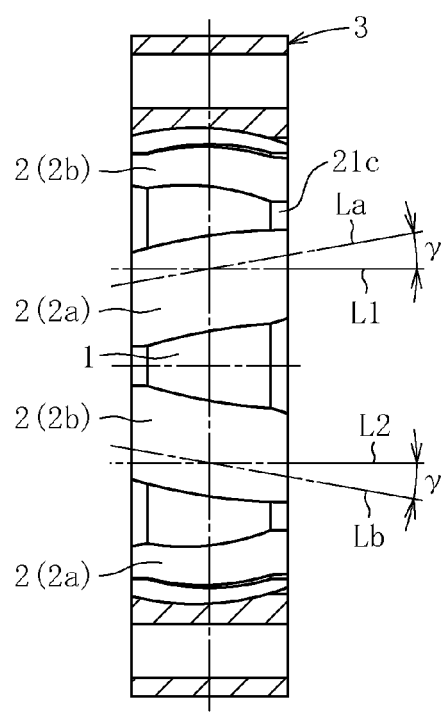
FIG. 34 is a sectional view of an outer joint member of the fixed type constant velocity universal joint of FIG. 33.
Figure 35:
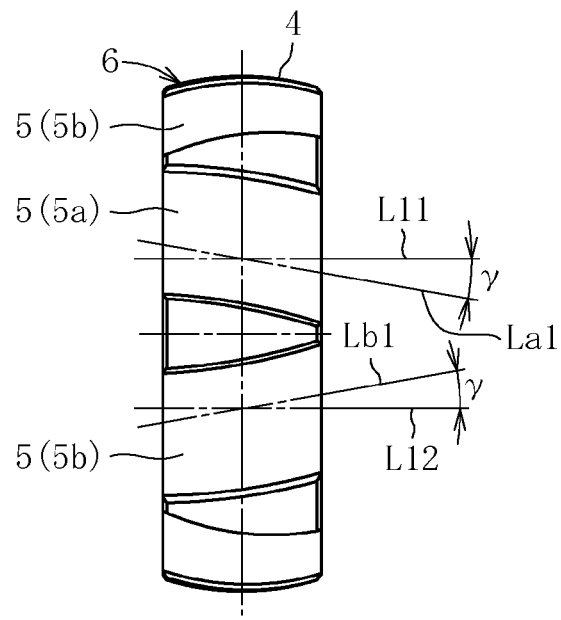
FIG. 35 is a sectional view of an inner joint member of the fixed type constant velocity universal joint of FIG. 33.

FIG. 31 illustrates the outer joint members 1123 and 1223 in a case where the center of curvature O23 is arranged at a position away from the joint center Oc, and in a case where the center of curvature O25 is arranged at a position closer with respect to the joint center Od. In FIG. 31, reference symbol O23 represents a center of curvature of each of the track grooves 1122 of the outer joint member 1123, which is arranged at the position away from the joint center Oc, and reference symbol O25 represents a center of curvature of each of the track grooves 1222 of the outer joint member 1223, which is arranged at the position closer with respect to the joint center Od. Further, FIG. 32 illustrates the inner joint members 1126 and 1226 in a case where the center of curvature O24 is arranged at a position away from the joint center Oc, and in a case where the center of curvature O26 is arranged at a position closer with respect to the joint center Od. In FIG. 32, reference symbol O24 represents a center of curvature of each of the track grooves 1125 of the inner joint member 1126, which is arranged at the position away from the joint center Oc, and reference symbol O26 represents a center of curvature of each of the track grooves 1225 of the inner joint member 1226, which is arranged at the position closer with respect to the joint center Od.

Note that, in FIG. 31, reference symbol K30 represents an outer joint member thickness of the axial end portion of each of the track grooves in a case where the center of curvature of each of the track grooves is aligned with the joint centers Oc and Od, and reference symbol K31 represents an outer joint member thickness of the axial end portion of each of the track grooves 1222 in a case where the center of curvature O25 of each of the track grooves 1222 is brought closer with respect to the joint center Od. Further, in FIG. 32, reference symbol K40 represents an inner joint member thickness of the axial end portion of each of the track grooves in a case where the center of curvature of each of the track grooves is aligned with the joint centers Oc and Od, and reference symbol K41 represents an inner joint member thickness of the axial end portion of each of the track grooves 1125 in a case where the center of curvature O24 of each of the track grooves 1125 is spaced away from the joint center Oc.

Thus, as in the case where the centers of curvature O11 and O13 of each of the track grooves 622 and 722 of the outer joint members 623 and 723 and the centers of curvature O12 and O14 of each of the track grooves 625 and 725 of the inner joint members 626 and 726 are shifted in the radial direction from the joint centers Oa and Ob, the same functions and advantages can be obtained.

Description is hereinabove made of the embodiments of the present invention. However, the present invention is not limited to the embodiments described above, and various modifications may be made thereto. For example, the present invention is not limited to the case where the center of curvature of each of the track grooves of the outer joint member and the center of curvature of each of the track grooves of the inner joint member are shifted in the radial direction from the joint center, the case where the inner surface of the outer joint member is formed into a cylindrical surface, or the case where the outer surface of the inner joint member is formed into a cylindrical surface.

In automobiles, the constant velocity universal joint of the present invention can be used, for example, in a drive shaft for transmitting power from an engine to a driving wheel and in a propeller shaft for transmitting the power from the transmission to a differential.

REFERENCE SIGNS LIST 21 inner surface
22, 22a, 22b track groove
23 outer joint member
24 outer surface
25, 25a, 25b track groove
26 inner joint member
27 ball
28 pocket
29 cage
29a outer spherical surface
29b inner spherical surface
31 first portion
32 second portion
42, 52 ellipse

The invention claimed is:
1. A constant velocity universal joint of a fixed type, comprising:
an outer joint member having an inner surface provided with eight track grooves;

an inner joint member having an outer surface provided with eight track grooves that are paired with the eight track grooves of the outer joint member;

eight balls that are interposed between the eight track grooves of the outer joint member and the eight track grooves of the inner joint member, for transmitting torque; and a cage that is interposed between the inner surface of the outer joint member and the outer surface of the inner joint member and comprises pockets for holding the eight balls, wherein an offset in an axial direction between a center of curvature of each of the eight track grooves of the outer joint member and a center of curvature of the inner surface of the outer joint member, and an offset in the axial direction between a center of curvature of each of the eight track grooves of the inner joint member and a center of curvature of the outer surface of the inner joint member are each set to zero, wherein the eight track grooves of the outer joint member and the eight track grooves of the inner joint member are each inclined with respect to an axial line, wherein circumferentially adjacent track grooves among the eight track grooves of the outer joint member and circumferentially adjacent track grooves among the eight track grooves of the inner joint member are inclined in directions opposite to each other, wherein the eight track grooves of the outer joint member and the eight track grooves of the inner joint member, which respectively face the eight track grooves of the outer joint member, are inclined in directions opposite to each other with respect to the axial line, wherein a circumferential length of each of the pockets of the cage is set so that two of the pockets allow a corresponding number of balls to be assembled therein at one time under a state in which the two of the pockets are exposed from the outer joint member through inclination of the cage at a predetermined angle with respect to the outer joint member, wherein the circumferential length of each of the pockets of the cage is larger than or equal to circumferential moving amounts of each of the balls in the pockets at a phase angle of 157.5 degrees which is largest in a case where the balls are assembled two at a time, and wherein the circumferential length of each of the pockets of the cage is smaller than circumferential moving amounts of each of the balls in the pockets at a phase angle of 135 degrees which is largest in a case where the balls are assembled one at a time.

2. A constant velocity universal joint according to claim 1, wherein the outer joint member comprises, at an end surface thereof:

first portions between axial opening ends of the eight track grooves; and second portions between the axial opening ends of the eight track grooves, the second portions being smaller than the first portions, wherein the first portions and the second portions are arranged alternately in a circumferential direction, and wherein a part between the two of the pockets, each of which allows the corresponding number of balls to be assembled therein at one time, faces a corresponding one of the first portions.

3. A constant velocity universal joint according to claim 1, wherein the outer joint member comprises, at an end surface thereof:

first portions between axial opening ends of the eight track grooves; and second portions between the axial opening ends of the eight track grooves, the second portions being smaller than the first portions, wherein the first portions and the second portions are arranged alternately in a circumferential direction, and wherein a part between the two of the pockets, each of which allows the corresponding number of balls to be assembled therein at one time, faces a corresponding one of the second portions.

\* \* \* \* \*